United States Patent [19]
Hobson et al.

[11] Patent Number: 6,065,067
[45] Date of Patent: May 16, 2000

[54] SYSTEM, METHOD AND PROGRAM FOR CONTROLLING ACCESS TO AN INPUT/OUTPUT DEVICE POSSIBLE RESOURCE SETTINGS DATA IN AN ADVANCED CONFIGURATION AND POWER INTERFACE OPERATING SYSTEM

[75] Inventors: Louis B. Hobson, Tomball; Vicki L. Carruthers, Houston, both of Tex.

[73] Assignee: Compaq Computer Corporation, Houston, Tex.

[21] Appl. No.: 09/035,441

[22] Filed: Mar. 5, 1998

[51] Int. Cl.[7] .............................. G06F 13/00; G06F 12/00; G06F 9/445

[52] U.S. Cl. .................................. 710/8; 710/10; 710/12; 710/36; 710/104; 713/1; 713/2; 713/100; 711/152

[58] Field of Search .................................. 395/284, 652, 395/828, 830, 832, 282, 283, 856, 479, 651, 653; 710/8, 10, 104, 12, 36, 102, 103; 713/1, 2, 100; 711/152

[56] References Cited

U.S. PATENT DOCUMENTS

| | | | |
|---|---|---|---|
| 5,353,432 | 10/1994 | Richek et al. | 395/500 |
| 5,412,798 | 5/1995 | Garney | 395/500 |
| 5,446,898 | 8/1995 | Bealkowski et al. | 395/700 |
| 5,517,646 | 5/1996 | Piccirillo et al. | 395/700 |
| 5,559,965 | 9/1996 | Oztaskin et al. | 395/284 |
| 5,586,324 | 12/1996 | Sato et al. | 395/652 |
| 5,608,876 | 3/1997 | Cohen et al. | 395/281 |
| 5,636,357 | 6/1997 | Weiner | 395/442 |
| 5,671,281 | 9/1997 | Campbell et al. | 380/25 |
| 5,729,717 | 3/1998 | Tamada et al. | 395/491 |
| 5,732,281 | 3/1998 | Summers et al. | 395/828 |
| 5,848,294 | 12/1998 | Clark | 395/856 |
| 5,903,894 | 5/1999 | Reneris | 707/100 |
| 5,937,200 | 8/1999 | Frid et al. | 395/737 |

FOREIGN PATENT DOCUMENTS

95/22794  8/1995  WIPO ............................. G06F 11/14

OTHER PUBLICATIONS

"Enhanced Network Installation", IBM Technical Disclosure Bulletin, v40 n11, p 163–164, Nov. 1997.

"Optimizing Utilization of Storage within a GUI by Hiding Designated Storage Volume from the Operating System", IBM Research Discolsure, v42 n418, article 41875, Feb. 1999.

Intel Web Page Printout, *TokenExpress™ PRO Adapter*, Plug and Play Computers, © 1998 Intel Corporation.

Compaq Computer Corporation, "Plug and Play BIOS Specification", Version 1.0A, May 5, 1994.

Intel, Microsoft, Toshiba, "Advanced Configuration and Power Interface Specification", Rev. 1.0, Dec. 22, 1996.

*Primary Examiner*—Thomas C. Lee
*Assistant Examiner*—Tanh Quang Nguyen
*Attorney, Agent, or Firm*—Conley, Rose & Tayon, P.C.; Michael F. Heim; Jonathan M. Harris

[57] ABSTRACT

During start-up of an advanced configuration and power interface computer system, a resource lock value is read from nonvolatile memory. If the resource lock value indicates system resources are to be locked, possible configuration setting data associated with motherboard input-output devices, is not loaded into memory at a location known to the operating system. If the resource lock value indicates system resources are not to be locked, possible configuration setting data is loaded into memory at a location known to the operating system.

40 Claims, 3 Drawing Sheets

SYSTEM, METHOD AND PROGRAM FOR CONTROLLING ACCESS TO AN INPUT/OUTPUT DEVICE POSSIBLE RESOURCE SETTINGS DATA IN AN ADVANCED CONFIGURATION AND POWER INTERFACE OPERATING SYSTEM

BACKGROUND

The invention relates to protecting configuration data associated with input-output (I/O) devices.

Known device configuration techniques such as plug-and-play are implemented via basic input-output system (BIOS) instructions stored in read only memory (ROM). One responsibility of a plug-and-play BIOS is to initialize all plug-and-play compatible devices coupled to a computer system's motherboard (main circuit board) during start-up. One aspect of this responsibility is the allocation and assignment of system level resources such as direct memory access (DMA) channels, interrupt request lines (IRQs), I/O addresses, and memory addresses.

A plug-and-play device can have two types of resource settings: current resource settings (CRS) and possible resource settings (PRS). Current resource settings refer to actual resource values (e.g., IRQ 4) and reflect the physical configuration of a device. Possible resource settings refer to those resource values that a device may be assigned (e.g., any IRQ between 3 and 9).

If a plug-and-play device has more than one PRS, known device configuration techniques allow a user to change resource assignments. Resource modification is generally performed during system start-up by an application that is executed before control is passed to an operating system (i.e., before the operating system is loaded). If a computer system's resources are locked, the user will be prompted for a password before any resource assignment changes can be made.

Under the new advanced configuration and power interface (ACPI), information associated with motherboard plug-and-play devices is stored in ACPI tables. This information, which is available to the operating system at all times, can include for each device: (1) a control method for determining the device's current configuration, i.e., CRS; (2) a list of possible resource values, i.e., PRS; and (3) control methods for modifying the device's resource values. Under the ACPI specification, there is no provision to reject (i.e., lock) a request to modify plug-and-play resources. If an ACPI operating system has data reflecting a device's PRS, the system may modify those settings.

SUMMARY

In one aspect, the invention features a method to control access to configuration data associated with a device in a computer system, where the configuration data is normally accessible to the computer's operating system when loaded at an expected memory location. The method includes determining if access to the configuration data is to be blocked and, if so, not making the configuration data accessible at the expected memory location. In some embodiments, the configuration data includes possible configuration setting information for a motherboard plug-and-play device. In other embodiments, the computer system executes an advanced configuration and control interface (ACPI) operating system, and the expected memory location is defined by one or more ACPI tables.

In another aspect, the invention features a program storage device having instructions encoded therein to perform the inventive method. In yet another aspect, the invention features a computer system capable of controlling access to device configuration data.

DETAILED DESCRIPTION

Figure 1:
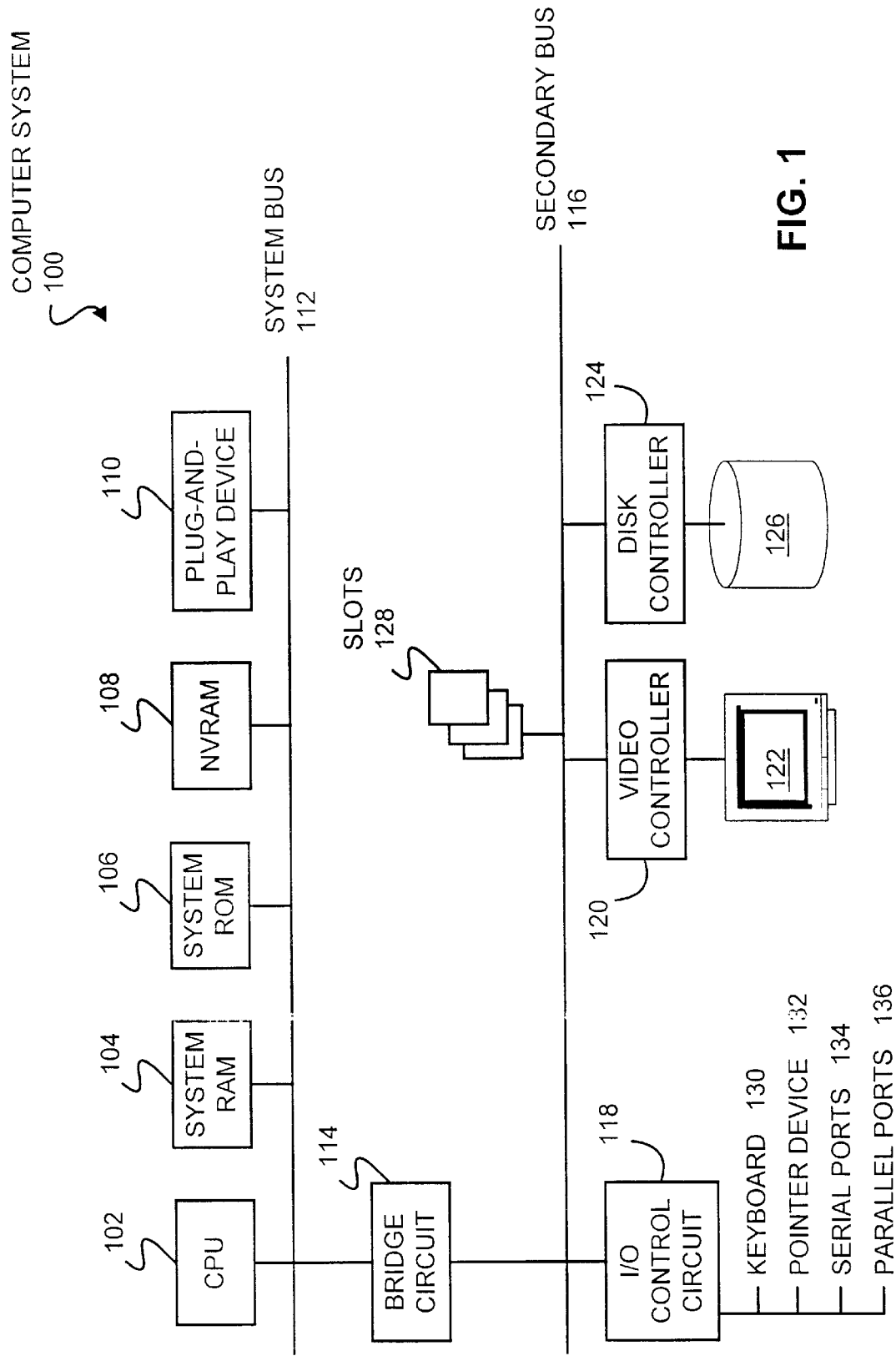
FIG. 1 shows a computer system.
Figure 2:
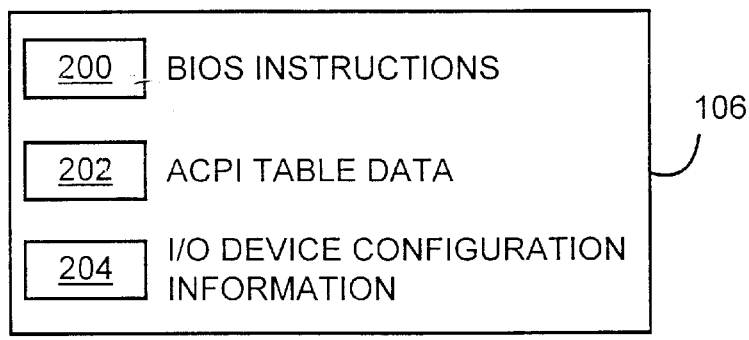
FIG. 2 shows a system read only memory.

Referring to FIG. 1, an advanced configuration and power interface (ACPI) computer system 100 providing plug-and-play device configuration security includes host processor (CPU) 102, random access memory (RAM) 104, read only memory (ROM) 106, nonvolatile random access memory (NVRAM) 108, and one or more plug-and-play devices 110 (only one shown) coupled to system bus 112. Illustrative host processors 102 include the PENTIUM, PENTIUM PRO, PENTIUM-II, and 80X86 families of processors from Intel Corporation. As shown in FIG. 2, system ROM 106 generally provides storage for computer system 100's basic input-output system (BIOS) instructions 200, ACPI table data 204, and system input-output device configuration information 206. System ROM 106 can be embodied in programmable versions of read only memory such as electrically erasable programmable ROM (EEPROM). System ROM 106, NVRAM 108, and plug-and-play device 110 will be discussed more fully below.

Referring again to FIG. 1, bridge circuit 114 couples system bus 112 to secondary bus 116. Components coupled to secondary bus 116 include input-output (I/O) control circuit 118, video controller 120 and associated display 122, disk controller 124 and associated disks (one shown) 126, and one or more expansion slots 128. Input-output control circuit 118 can provide an interface for devices such as user keyboard 130, pointer device 132, and serial 134 and parallel 136 ports.

Figure 4:
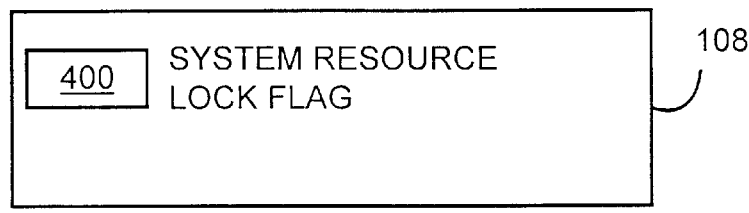
FIG. 4 shows a nonvolatile random access memory.
Figure 3:
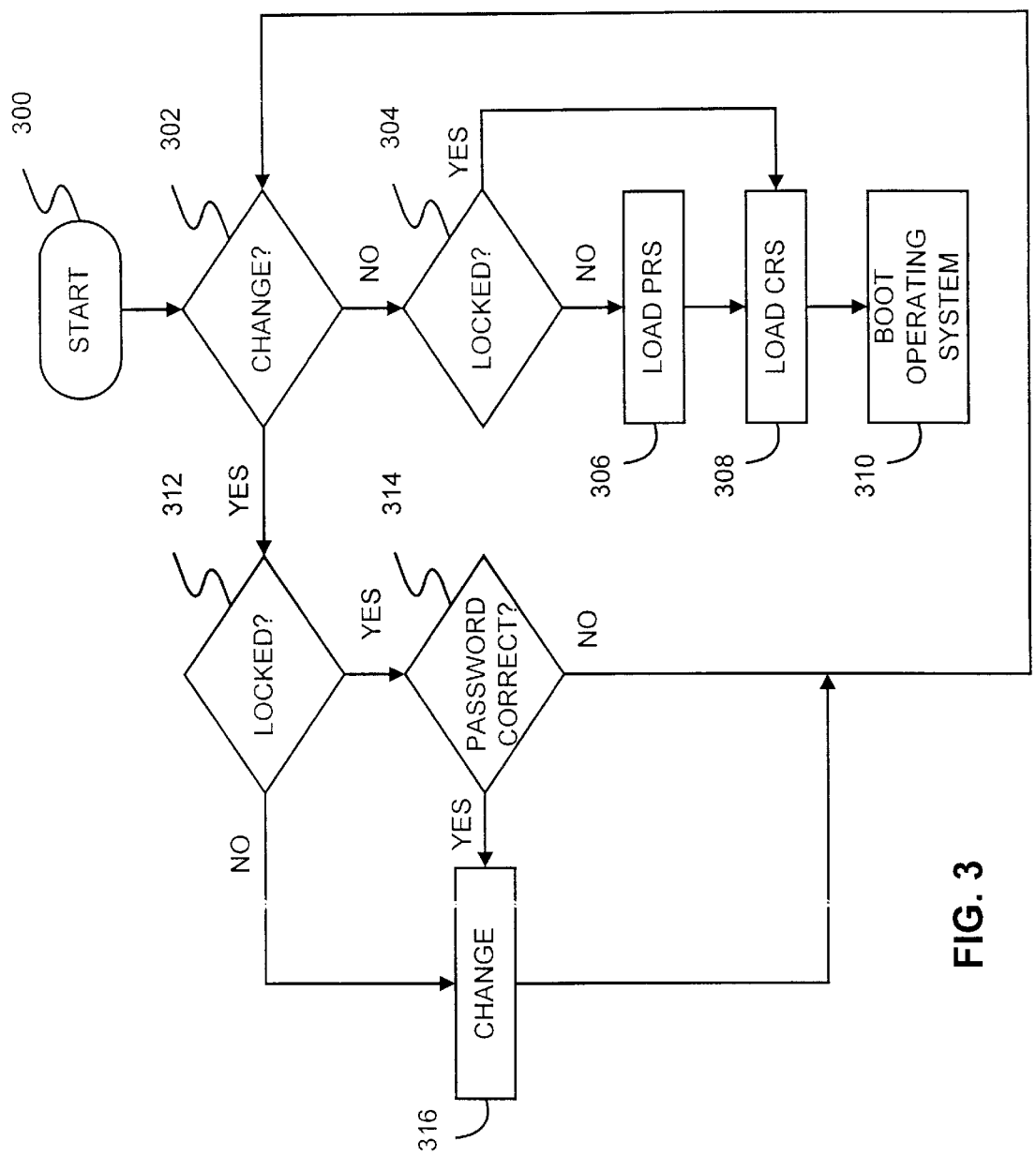
FIG. 3 shows an advanced configuration and power interface computer system start-up procedure.

Referring to FIG. 3, computer system 100 start-up (also referred to as power-on self test or POST processing) begins with system BIOS execution at step 300. If a user does not attempt to modify the current resource setting (CRS) of motherboard plug-and-play device 110 (the 'no' prong of step 302), a test is made to determine if system resource settings have been locked (step 304). As shown in FIG. 4, indication of whether system resources are locked is typically stored in NVRAM 108 through a system resource lock flag 400. Nonvolatile RAM 108 can be a CMOS memory device or any other memory device capable of retaining stored information after system 100 is powered down.

If system resources are not locked (the 'no' prong of step 304), any possible resource settings (PRS) and the CRS for each plug-and-play device are loaded into system RAM 104 at a location known by the operating system in steps 306 and 308 respectively.

If resources are locked (the 'yes' prong of step 304), only CRS data is loaded into system RAM 104 where the operating system can access it. Following completion of BIOS start-up routines, the ACPI operating system is loaded and given control of computer system 100 (step 310).

Figure 5:
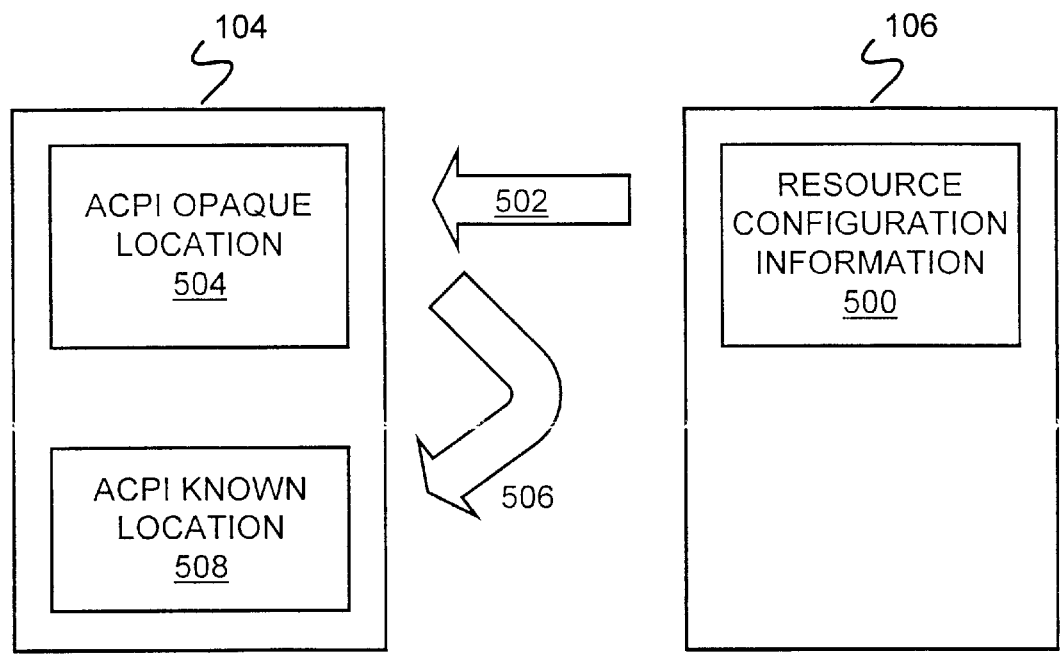
FIG. 5 shows loading device resource information from read only memory to random access memory during computer system start-up.

Referring to FIG. 5, configuration information 500 (CRS and PRS) is generally copied 502 into a first location 504 in system RAM 104 during POST processing. While an ACPI operating system may physically access this first location 504, information about what data is stored there is not generally known (is opaque) to the operating system. That is, configuration information initially copied into system RAM 104 from system ROM 106 is not functionally accessible to the operating system. During step 306 (see FIG. 3) PRS information is copied 506 from the first location 504 into a second location 508 that the ACPI operating system is cognizant of. CRS information is similarly copied during step 308 of FIG. 3. When configuration data is in memory at a location known by the operating system 508, it has been loaded.

Referring again to FIG. 3, if the user wants to change one or more system resource settings (the 'yes' prong of step 302), system 100 can be notified through a key stroke command such as F10. When the BIOS receives a modify command (e.g., via F10), it executes a low-level system set-up application which prompts the user to enter changes. If system resources are locked (the 'yes' prong of step 312), the user is prompted for a password. If the entered password is correct (the 'yes' prong of step 314), user specified changes and accepted and stored in NVRAM 108 (step 316). After a resource assignment is changed, or if the user supplied password is incorrect (the 'no prong of step 314), start-up processing begins again at step 302.

A feature of the invention is that when system configuration data is locked, PRS data is segregated from CRS data and is not available to an ACPI operating system. This allows a computer system designer to implement a device configuration locking mechanism which is not available in a standard ACPI computer system. More generally, this approach hides computer system hardware features from an ACPI operating system such as thermal models and input-output configuration data.

The foregoing description is illustrative only and is not to be considered limiting. Various changes in the materials, components, circuit elements, as well as in the details of the illustrated operational method are possible without departing from the scope of the claims. For example, either system bus 112 or secondary bus 116 can be proprietary or special purpose buses, peripheral component interface (PCI) buses, industry standard architecture (ISA) buses, extended industry standard architecture (EISA) buses, or combinations of one or more of these busses. Further, PRS, CRS, and other ACPI table data can be stored in system ROM 108 in a compressed format to minimize memory usage. Device configuration information can also be stored in a different memory device than the system BIOS instructions. Steps of the invention may be performed by a computer processor executing instructions organized into a program module. Storage devices suitable for tangibly embodying computer program instructions include all forms of nonvolatile memory including, but not limited to: semiconductor memory devices such as EPROM, EEPROM, and flash devices; magnetic disks (fixed, floppy, and removable); other magnetic media such as tape; and optical media such as CD-ROM disks.

What is claimed is:

1. A computer system comprising:
    a bus;
    a host processor operatively coupled to the bus;
    an input-output device operatively coupled to the bus;
    a first memory operatively coupled to the bus and including advanced configuration and power interface table data and possible resource setting data, wherein the possible resource setting data is kept opaque to an advanced configuration and power interface operating system.

2. The computer system of claim 1, wherein the bus comprises an industry standard architecture bus.

3. The computer system of claim 1, wherein the bus comprises a peripheral component interface bus.

4. The computer system of claim 1, wherein the input-output device comprises a motherboard plug-and-play device.

5. The computer system of claim 1 further comprising a second memory operatively coupled to the bus and comprising a resource lock indication, said resource lock indication indicating when said possible resource setting data is kept opaque from said advanced configuration and power interface operating system.

6. The computer system of claim 5, wherein the second memory comprises a nonvolatile memory.

7. The computer system of claim 1, wherein the first memory comprises a programmable read only memory.

8. The computer system of claim 1, wherein the first memory includes advanced configuration and power interface basic input-output system instructions.

9. The computer system of claim 1, wherein the possible resource setting data is stored in the first memory in a compressed format.

10. The computer system of claim 1, wherein the advanced configuration and power interface table data is stored in the first memory in a compressed format.

11. A computer system comprising:
    a bus;
    a host processor operatively coupled to the bus;
    a motherboard plug-and-play device operatively coupled to the bus;
    a basic input-output system memory operatively coupled to the bus and including advanced configuration and power interface table data and possible resource setting data, wherein the possible resource setting data is kept opaque to an advanced configuration and power interface operating system; and
    a nonvolatile memory operatively coupled to the bus and comprising a resource lock indication, said resource lock indication indicating when said possible resource setting data is kept opaque from said advanced configuration and power interface operating system.

12. The computer system of claim 11, wherein the bus comprises an industry standard architecture bus.

13. The computer system of claim 11, wherein the bus comprises a peripheral component interface bus.

14. The computer system of claim 11, wherein the basic input-output system memory comprises a programmable read only memory.

15. The computer system of claim 11, wherein the possible resource setting data is stored in a compressed format.

16. A method of making possible resource setting configuration data for a device available to an advanced configuration and power interface operating system, the method comprising:
    determining if a resource flag is set; and
    loading the possible resource setting configuration data into a first memory at a location known by the advanced configuration and power interface operating system to contain said possible resource setting configuration data only if the resource flag is not set.

17. The method of claim 16, wherein determining if the resource flag is set comprises reading a value from a nonvolatile memory.

18. The method of claim 16, wherein loading the possible resource setting configuration data comprises copying the possible resource setting configuration data from a second memory into the first memory.

19. The method of claim 16, wherein the first memory is random access memory.

20. The method of claim 18, wherein the second memory is read only memory.

21. The method of claim 20, wherein the read only memory further comprises basic input-output system instructions.

22. The method of claim 16, wherein the device is a motherboard plug-and-play device.

23. A method of controlling access to possible configuration data associated with a device of a computer system in which the possible configuration data is normally accessible to an operating system of the computer system at an expected memory location, the method comprising:

determining if access to the possible configuration data by the operating system is to be blocked; and if so, not making the possible configuration data accessible at the expected memory location.

24. The method of claim 23, wherein determining if access to the possible configuration data comprises reading a value from a nonvolatile memory, said value indicates when said possible configuration data access by the operating system is to be blocked.

25. The method of claim 23, wherein making the possible configuration data accessible comprises loading the possible configuration data from a first memory to the expected memory location in a second memory.

26. The method of claim 23, wherein the possible configuration data comprises possible configuration data for an input-output device.

27. The method of claim 26, wherein the input-output device comprises a motherboard plug-and-play device.

28. The method of claim 25, wherein the first memory comprises read only memory.

29. The method of claim 25, wherein the second memory comprises random access memory.

30. The method of claim 28, wherein the read only memory further comprises basic input-output system instructions.

31. A method of making motherboard plug-and-play device possible resource setting configuration data available to an advanced configuration and power interface operating system, the method comprising:

reading a resource lock value from a nonvolatile memory; and loading the possible resource setting configuration data into a random access memory at a location known by the advanced configuration and power interface operating system to contain said possible resource setting configuration data only if the resource lock value indicates a not-locked state.

32. The method of claim 31, wherein loading the possible resource setting configuration data comprises copying the possible resource setting configuration data from a read only memory into the random access memory.

33. The method of claim 32, wherein the read only memory further comprises basic input-output system instructions.

34. The method of claim 32, wherein the possible resource setting configuration data is stored in the read only memory in a compressed format.

35. A program storage device readable by a machine, the program storage device having encoded therein a program of instructions to control access to configuration data associated with a device, the configuration data normally accessible to the machine at an expected memory location, the program including instructions to:

determine if access to the configuration data by the machine is to be blocked; and if so, not make the configuration data accessible at the expected memory location by not loading the configuration data from a first memory to the expected memory location.

36. The program storage device of claim 35, wherein the instructions to determine access to the configuration data includes instruction to read a value from a nonvolatile memory.

37. The program storage device of claim 35, wherein the configuration data comprises possible configuration data for an input-output device.

38. The program storage device of claim 37, wherein the input-output device is a motherboard plug-and-play device.

39. The program storage device of claim 35, wherein the first memory is read only memory.

40. The program storage device of claim 35, wherein the expected memory location is random access memory.

\* \* \* \* \*